(12) United States Patent
Dawson et al.

(10) Patent No.: US 9,880,907 B2
(45) Date of Patent: Jan. 30, 2018

(54) SYSTEM, METHOD, AND COMPUTER PROGRAM PRODUCT FOR DYNAMIC VOLUME MOUNTING IN A SYSTEM MAINTAINING SYNCHRONOUS COPY OBJECTS

(71) Applicant: International Business Machines Corporation, Armonk, NY (US)

(72) Inventors: Erika M. Dawson, Tucson, AZ (US); Katsuyoshi Katori, Kawasaki (JP); Takeshi Nohta, Tsukuba (JP); Joseph M. Swingler, Phoenix, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 275 days.

(21) Appl. No.: 14/675,549

(22) Filed: Mar. 31, 2015

(65) Prior Publication Data
US 2016/0291889 A1 Oct. 6, 2016

(51) Int. Cl.
*G06F 12/00* (2006.01)
*G06F 11/14* (2006.01)
*G06F 3/06* (2006.01)

(52) U.S. Cl.
CPC .......... *G06F 11/1469* (2013.01); *G06F 3/065* (2013.01); *G06F 3/067* (2013.01); *G06F 3/0619* (2013.01); *G06F 3/0665* (2013.01); *G06F 11/1458* (2013.01)

(58) Field of Classification Search
None
See application file for complete search history.

(56) References Cited

U.S. PATENT DOCUMENTS

| | | | |
|---|---|---|---|
| 7,076,685 B2 | 7/2006 | Pillai et al. | |
| 7,613,806 B2 | 11/2009 | Wright et al. | |
| 8,301,593 B2 | 10/2012 | Hoffmann et al. | |
| 2014/0032957 A1* | 1/2014 | Beeston | G06F 11/2097 714/2 |

OTHER PUBLICATIONS

Keleher, P.J., "Tapeworm: High-Level Abstractions of Shared Accesses," USENIX Association, Proceedings of the 3rd Symposium on Operating Systems Design and Implementation, Feb. 1999, 15 pages.
IBM, "IBM Virtualization Engine TS7700 Series: Introduction and Planning Guide," IBM Corporation, Jan. 2013, 324 pages.
IBM, "IBM Virtualization Engine TS7700 Series; z/OS Host Command Line Request User's; Guide Version 2.1d," IBM Corporation, Oct. 2012, 90 pages.
Dawson et al., U.S. Appl. No. 15/806,180, dated Nov. 7, 2017.

* cited by examiner

*Primary Examiner* — Daniel Tsui
(74) *Attorney, Agent, or Firm* — Zilka-Kotab, P.C.

(57) ABSTRACT

In one embodiment, an apparatus comprises a processor and logic integrated with and/or executable by the processor, the logic being configured to cause the processor to receive, from a host, a command directed to a volume, the command including a parameter. The logic is further configured to cause the processor to evaluate a policy associated with the host, and, based on the evaluation of the policy associated with the host, determine a value of the parameter included in the command. Still yet, the logic is configured to cause the processor to open two copies of the volume in response to the parameter including a first value, and open only one of the two copies of the volume in response to the parameter including a second value.

20 Claims, 4 Drawing Sheets

SYSTEM, METHOD, AND COMPUTER PROGRAM PRODUCT FOR DYNAMIC VOLUME MOUNTING IN A SYSTEM MAINTAINING SYNCHRONOUS COPY OBJECTS

BACKGROUND

The present invention relates to data storage, and more particularly, to systems, methods, and computer program products configured for dynamically mounting storage volumes.

In a multi-cluster environment, a copy of a volume is stored at multiple sites or clusters. Each cluster may be electronically connected to other clusters via an Ethernet wide area network (WAN) for synchronous and asynchronous volume replication. When two or more copies of a volume are configured for synchronous mode replication, data may be written to the hosting clusters in parallel using explicit or implicit synchronization points.

User-configured policies may dictate how the two or more copies of the synchronously replicated volume may be opened under specific circumstances.

BRIEF SUMMARY

An apparatus is disclosed herein as including a processor and logic integrated with and/or executable by the processor, the logic being configured to cause the processor to receive, from a host, a command directed to a volume, where the command includes a parameter. Further, the logic is configured to cause the processor to evaluate a policy associated with the host, and based on the evaluation of the policy associated with the host, determine a value of the parameter included in the command. Still yet, the logic is configured to cause the processor to, in response to the parameter including a first value, open two copies of the volume. Also, the logic is configured to cause the processor to, in response to the parameter including a second value, open only one of the two copies of the volume.

A method for dynamic volume mounting is disclosed herein, the method including receiving, from a host, a command directed to a volume, where the command includes a parameter. The method further includes evaluating a policy associated with the host, and, based on the evaluation of the policy associated with the host, determining a value of the parameter included in the command. Still further, the method includes opening two copies of the volume in response to the parameter including a first value. Moreover, the method includes opening only one of the two copies of the volume in response to the parameter including a second value.

A computer program product for dynamic volume mounting is disclosed, the computer program product including a computer readable storage medium having program instructions embodied therewith, the program instructions executable by a processor to cause the processor to perform a method including receiving, from a host, a command directed to a volume, where the command includes a parameter. Additionally, the program instructions cause the processor to evaluate a policy associated with the host, and, based on the evaluation of the policy associated with the host, determine a value of the parameter included in the command. The program instructions cause the processor to, in response to the parameter including a first value, open two copies of the volume. Moreover, the program instructions cause the processor to, in response to the parameter including a second value, open only one of the two copies of the volume.

Other aspects and embodiments of the present invention will become apparent from the following detailed description, which, when taken in conjunction with the drawings, illustrate by way of example the principles of the invention.

DETAILED DESCRIPTION

Figure 1:
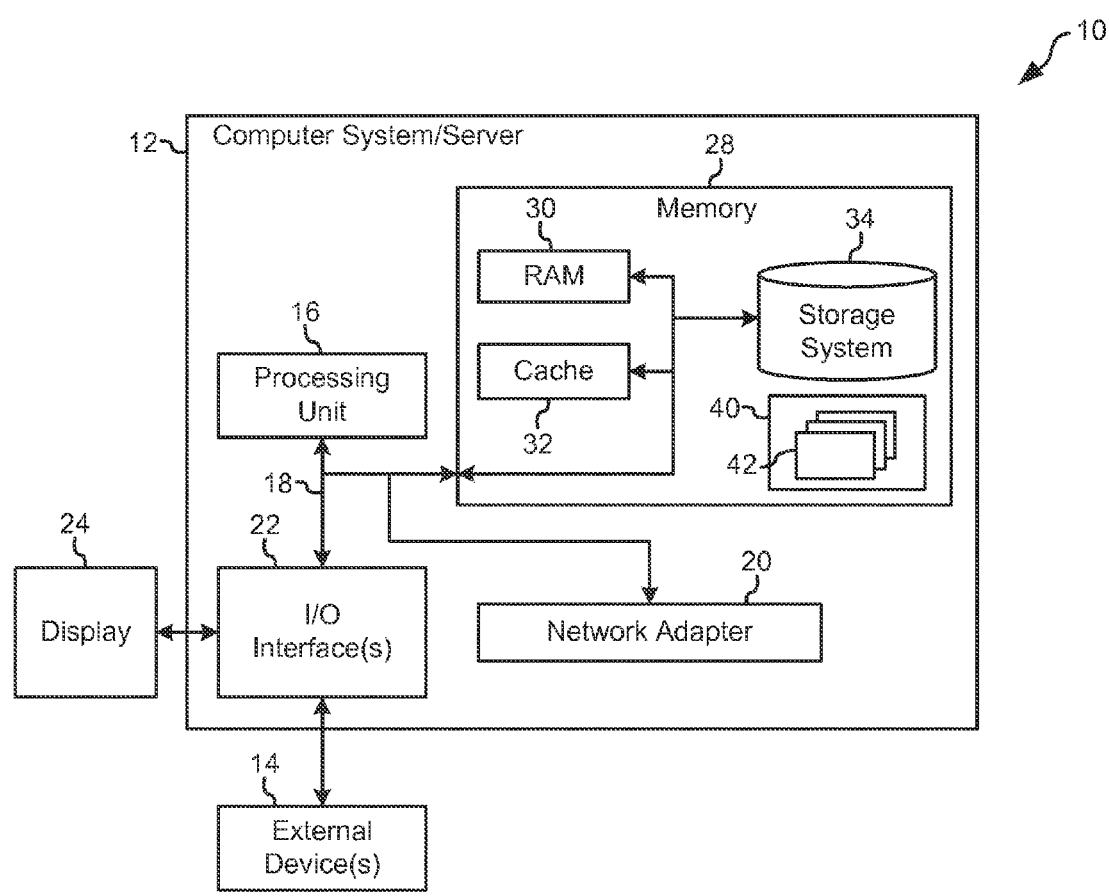
FIG. 1 illustrates a network storage system, according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an," and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for dynamic volume mounting in a system maintaining synchronous copy objects. For example, in a virtual tape environment having synchronous mode replication, a parameter is passed to microcode to identify if the host is likely to append or modify. If so, two synchronous 'S' locations are opened so as to avoid a sync-deferred state.

In one general embodiment, an apparatus is disclosed herein as including a processor and logic integrated with and/or executable by the processor, the logic being configured to cause the processor to receive, from a host, a command directed to a volume, where the command includes a parameter. Further, the logic is configured to cause the processor to evaluate a policy associated with the host, and based on the evaluation of the policy associated with the host, determine a value of the parameter included in the command. Still yet, the logic is configured to cause the processor to, in response to the parameter including a first value, open two copies of the volume. Also, the logic is configured to cause the processor to, in response to the parameter including a second value, open only one of the two copies of the volume.

In another general embodiment, a method for dynamic volume mounting is disclosed herein, the method including receiving, from a host, a command directed to a volume, where the command includes a parameter. The method further includes evaluating a policy associated with the host, and, based on the evaluation of the policy associated with the host, determining a value of the parameter included in the command. Still further, the method includes opening two copies of the volume in response to the parameter including a first value. Moreover, the method includes opening only one of the two copies of the volume in response to the parameter including a second value.

In another general embodiment, a computer program product for dynamic volume mounting is disclosed, the computer program product including a computer readable storage medium having program instructions embodied therewith, the program instructions executable by a processor to cause the processor to perform a method including receiving, from a host, a command directed to a volume, where the command includes a parameter. Additionally, the program instructions cause the processor to evaluate a policy associated with the host, and, based on the evaluation of the policy associated with the host, determine a value of the parameter included in the command. The program instructions cause the processor to, in response to the parameter including a first value, open two copies of the volume. Moreover, the program instructions cause the processor to, in response to the parameter including a second value, open only one of the two copies of the volume.

Referring now to FIG. 1, a schematic of a network storage system 10 is shown according to one embodiment. This network storage system 10 is only one example of a suitable storage system and is not intended to suggest any limitation as to the scope of use or functionality of embodiments of the invention described herein. Regardless, network storage system 10 is capable of being implemented and/or performing any of the functionality set forth hereinabove.

In the network storage system 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in the network storage system 10 is shown in the form of a general-purpose computing device. The components of computer system/server 12 may include, but are not limited to, one or more processors 16 or processing units, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 may include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 may be provided for reading from and writing to a non-removable, non-volatile magnetic media—not shown and typically called a "hard disk," which may be operated in a hard disk drive (HDD). Although not shown, a magnetic disk drive for reading from and writing to a removable, non-volatile magnetic disk (e.g., a "floppy disk"), an optical disk drive for reading from or writing to a removable, non-volatile optical disk such as a CD-ROM, DVD-ROM or other optical media, and/or a magnetic tape drive for reading from or writing to non-volatile magnetic tape provided in a removable tape cartridge may be provided. In such instances, each may be connected to bus 18 by one or more data media interfaces. As will be further depicted and described below, memory 28 may include at least one program product having a set (e.g., at least one) of program modules that are configured to carry out the functions of embodiments described herein.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication may occur via Input/Output (I/O) interfaces 22. Still yet, computer system/server 12 may communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2A:
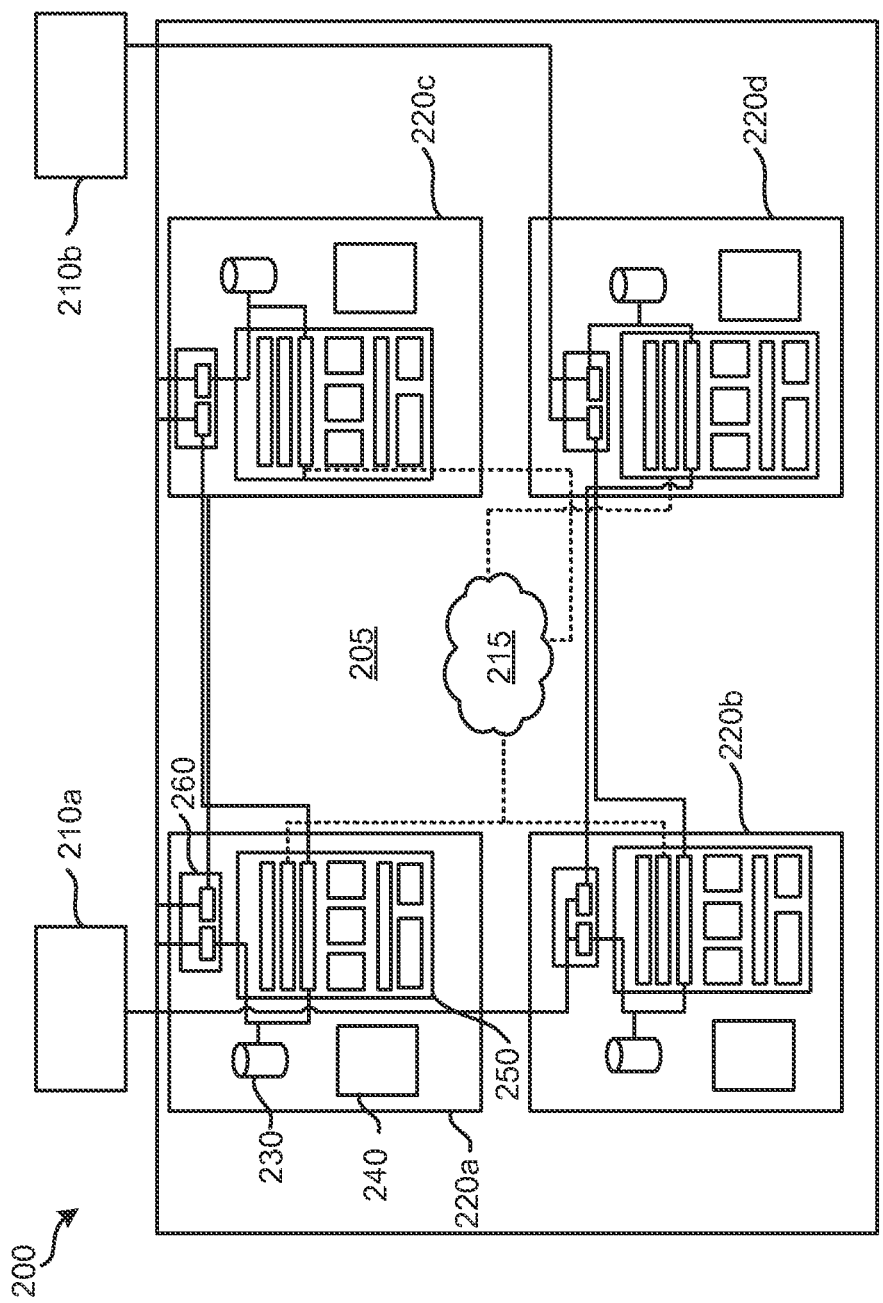
FIGS. 2A-2B show schematic block diagrams of a storage system for dynamic volume mounting in a system maintaining synchronous copy objects, in accordance with one embodiment
Figure 2B:
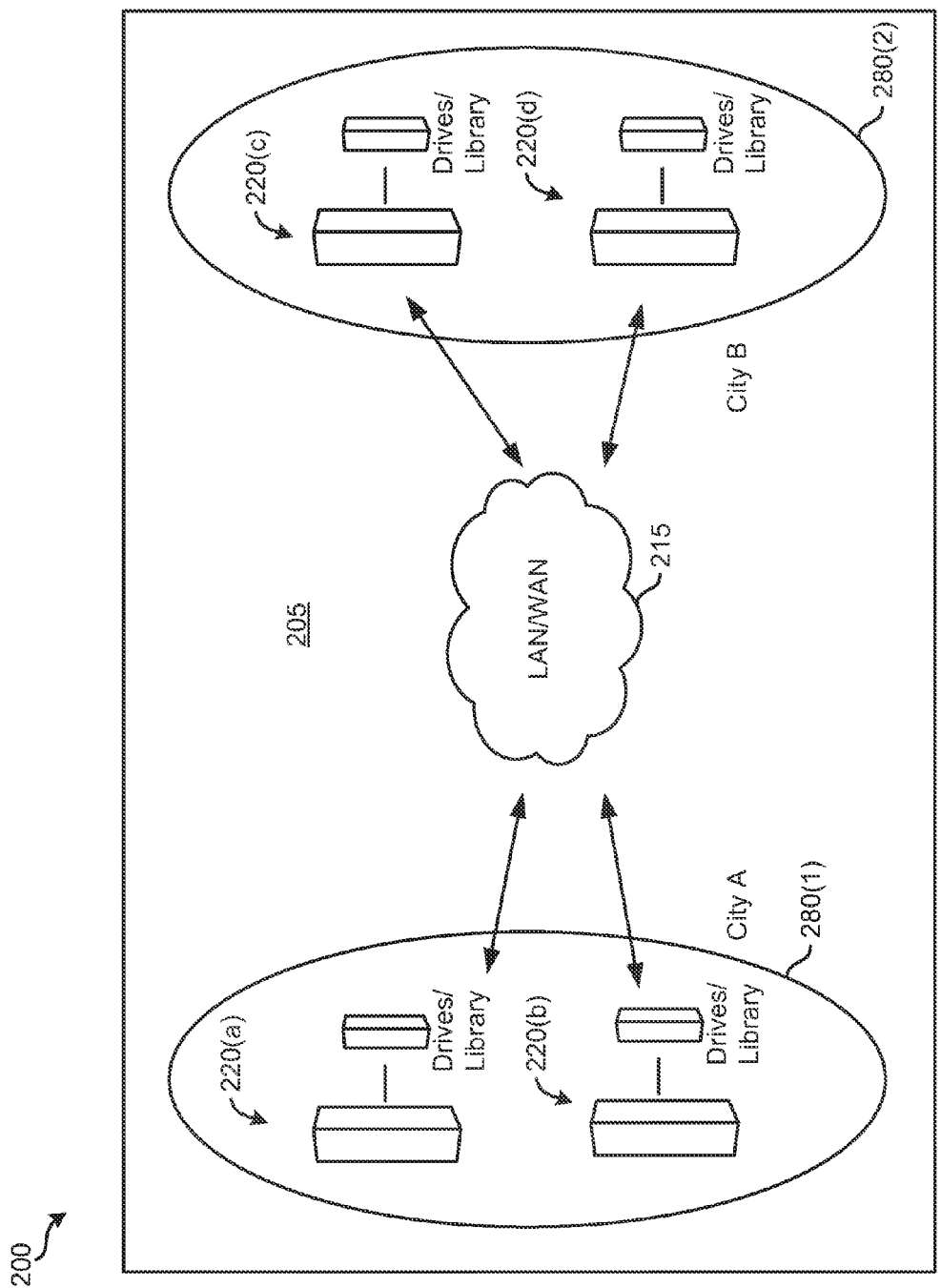

FIGS. 2A-2B are schematic block diagrams of a storage system 200 for dynamic volume mounting in a system maintaining synchronous copy objects, in accordance with one embodiment. As an option, the present storage system 200 may be implemented in conjunction with features from any other embodiment listed herein, such as those described with reference to the other FIGS. Of course, however, such storage system 200 and others presented herein may be used in various applications and/or in permutations which may or may not be specifically described in the illustrative embodiments listed herein. Further, the storage system 200 presented herein may be used in any desired environment. Thus FIGS. 2A-2B (and the other FIGS.) should be deemed to include all possible permutations.

One or more storage systems 200 may be embodied at each of a plurality of physically separated sites. Moreover, the storage systems 200 may store data in different physical media, including, but not limited to, storage cartridges, disk drives, solid state disks (SSD), disks direct access storage devices (DASD), magnetic tape drives, libraries, and disk drive arrays, such as RAID (redundant array of independent disks), or JBOD (just a bunch of disks). An example of a storage cartridge is a magnetic tape cartridge, which includes a rewritable magnetic tape wound on a hub of reel, and a cartridge memory. One example of a magnetic tape cartridge includes a cartridge based on LTO (Linear Tape Open) technology.

The storage systems 200 may store data in different forms, such as logical or virtual data. Herein, data may be organized in any of various forms, called "volumes" or "objects", the terms chosen without reference to any particular size or arrangement of data.

As illustrated in FIGS. 2A-2B, the storage system 200 provides storage for a plurality of host systems 210a, 210b. For example, the storage system 200 includes a plurality of hosts 210a, 210b, a plurality of clusters 220, and a network 215. Although two (2) hosts 210a, 210b, four (4) clusters 220a, 220b, 220c, 220d and one (1) network 215 are shown in FIG. 2A, any number of hosts 210a, 210b, clusters 220, and networks 215 may be employed. Accordingly, any number of clusters 220 may be included in storage system 200.

As illustrated in FIG. 2A, the storage system 200 may employ four (4) clusters 220a, 220b, 220c, 220d connected by a network 215 with each cluster 220 including a virtualization node ("VN") 260 and a storage device 230 for emulating a tape drive or tape library to hosts 210a, 210b. In an embodiment, clusters 220a, 220b, 220c, 220d are virtual tape server cluster.

Each cluster 220 includes a hierarchical storage node ("HSN") 250 for locally moving and/or transferring data between storage device 230 and library 240. In an embodiment, storage system 200 includes a disk storage 230 and a tape library 240. In an embodiment, the library 240 is an automated tape library ("ATL"). The HSN 250 may operate to remotely transfer data between the local disk storage 230 and the remote disk storage 230. The disk storage 230 may include one or more disk drives arranged as a RAID, JBOD, SSD or any combination thereof, for example.

Each cluster 220 may include a library manager with magnetic tapes. The hosts 210a, 210b may initiate and run tasks or jobs, such as tape jobs, in which data is read from and written to the magnetic tapes in the cluster families 280 and/or family members 220. The hosts 210a, 210b may be mainframe computers, servers, or the like. The hosts 210a, 210b may have the ability to run or host multiple operating systems. For example, the hosts 210a, 210b may run or may host multiple operating systems such Linux, Java, Windows or the like. Each of the hosts 210a, 210b of the storage system 200 may operate as the single mainframe computer, one or more servers, or as number of virtual machines. The hosts 210a, 210b may provide three levels of virtualization through logical partitions (LPARs) via the PR/SM facility, through virtual machines via the z/VM operating system, and through operating systems, notably z/OS with key-protected address spaces and goal-oriented workload scheduling.

The hosts 210a. 210b may communicate with the cluster 220 over the network 215 to access a plurality of magnetic tape drives, disk drives, and other storage devices through the cluster family members 220 as will be described hereafter. For example, a first host 210a may communicate over the network 215 to access a storage device and a magnetic tape through a first cluster 220a.

Each cluster 220 may include a hierarchical storage controller, such as hierarchical storage node. The cluster 220 may provide a single point management for data to be read and stored, aggregating storage pools in which storage can easily be allocated to different hosts 210a, 210b, scaling the storage system 200 by adding storage or storage control nodes, and a platform for implementing advanced functions such as fast-write cache, point-in-time copy, transparent data migration, and remote copy.

Each of the clusters 220 may be connected between themselves and with the hosts 210a, 210b over the network 215 to access data written on the magnetic tape and/or to write data to the magnetic tape. The plurality of clusters 220 may form a domain 205 of the storage system 200. The domain 205 may represent a multi-cluster or grid configuration. The domain 205 may include two or more clusters 220.

The network 215 of the storage system 200 may be storage area network (SAN), a token ring network, local area network (LAN), wide area network (WAN), the Internet, a dedicated network, a combination of networks, and the like. The SAN may consist of a "fabric" through which the hosts 210a, 210b may communicate with the clusters 220 over the network 215. The fabric may include a Fibre Channel network, an Ethernet network, or the like. All elements may not share the same fabric for communication. The first host 210a may communicate with the first cluster 220a over one fabric. In addition, the first host 210a may communicate with a third cluster 220c over another fabric.

Each storage system 200 may include a cluster family 280. The cluster family 280 may include a plurality of cluster family members 220 that are arranged, configured, organized, and/or grouped into the cluster family 280 For example, as illustrated in FIG. 2B, storage system 200 includes cluster family 280(1) and cluster family 280(2). Cluster family 280(1) includes a plurality of clusters 220(a), 220(b) grouped into family members of cluster family 280(1). Cluster family 280(2) includes a plurality of cluster family members 220(c), 220(d) grouped into family members of cluster family 280(2). Cluster family 280(1) and cluster family 280(2) communicate with each via network, such as network 215. Each cluster family 280 may be given or assigned a name. For example, cluster family 280(1) may be named as City A and cluster family 280(2) may be named as City B.

Although, for simplicity, FIG. 2B illustrates a storage system 200 having two cluster families 280. Any number of storage systems 200, cluster families 280, and cluster family members 220 may be employed.

An example of a storage system 200 is the IBM® TS7700 Virtual Tape Server.

As noted above, user-configured policies may dictate how the two or more copies of the synchronously replicated volume may be opened under specific circumstances. For example, a management class setting may specify two specific clusters with synchronous copies of the volume. Further, a management interface attribute of the management class setting may be configured such that both locations are opened during a private mount, or only one location is opened during the private mount.

For example, a user-configured policy may specify that each cluster should open a copy when appending or modifying a volume, but that only one cluster needs to open a copy when the volume is being read. Such a configuration allows the user to review application workload, and assign different policies based on whether the application typically reads with specific mounts, or typically writes or appends.

A broad user-configured policy may, however, result in a single copy of a volume being mounted for an application that typically only reads a volume, but actually will append or modify the volume during a particular mount. For example, while a single copy of a synchronously replicated volume is mounted for a storage management application that typically only reads mounted volumes, the storage management application may append the mounted volume. In such a situation, with only one copy of the synchronously replicated volume being mounted, the clusters may need to switch to a synchronization deferred state, and queue additional operations with the modified volume until the mounting application is finished using the mount and the volume is unloaded. Switching to the synchronization deferred state may cause the entire system to enter a degraded state.

Further, where the majority of mounts do not append the mounted volume, configuring polices to always open both copies of a synchronously replicated volume will also introduce an excessive use of system overhead.

Therefore, the reliance on a single policy that dictates how volumes should be opened based on the mounting application may delay synchronization between volume copies, and result in unnecessary overhead on the system and the WAN.

Figure 3:
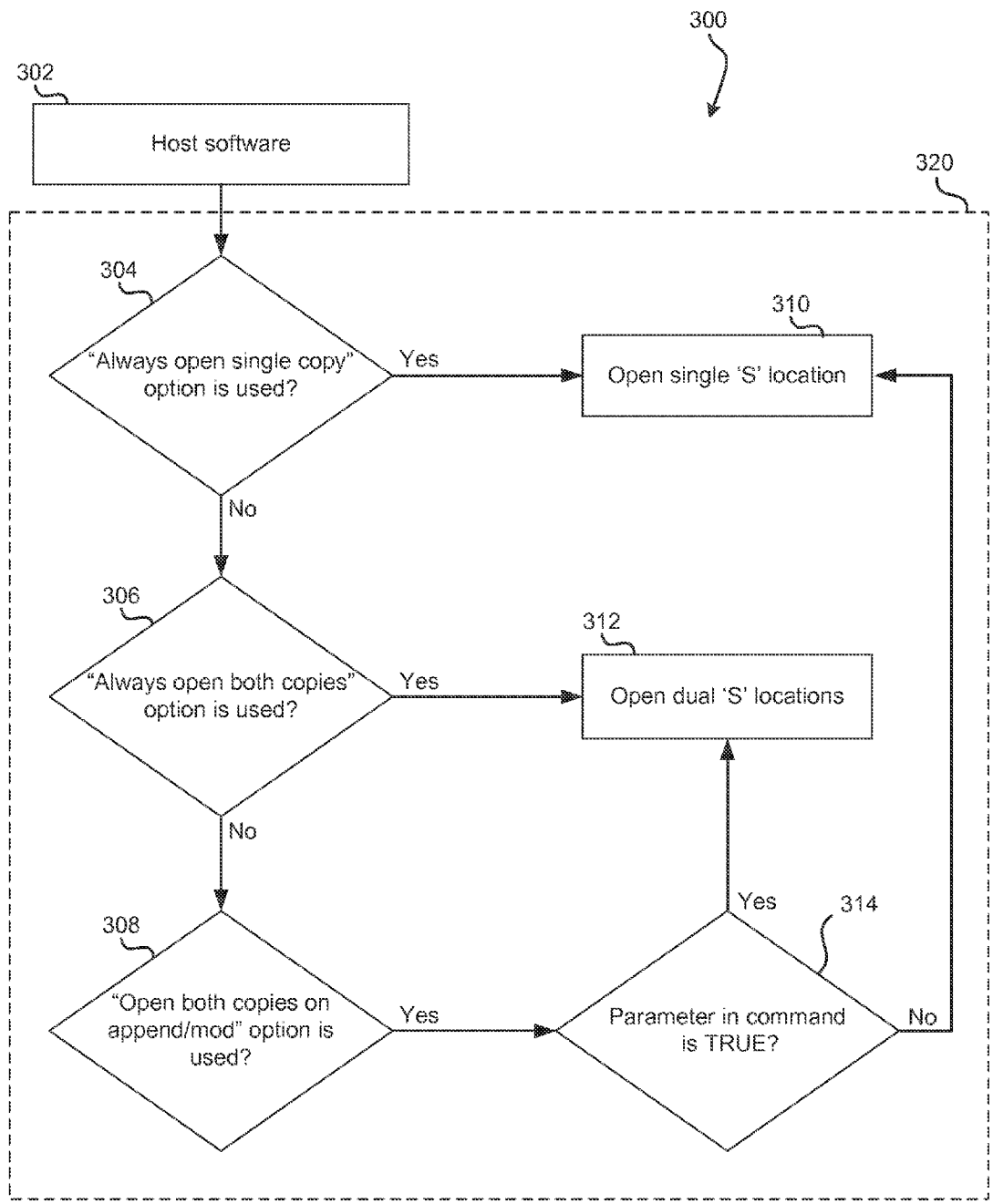
FIG. 3 shows a method for dynamic volume mounting in a system maintaining synchronous copy objects, according to one embodiment.

Referring now to FIG. 3, a method 300 is shown for dynamic volume mounting in a system maintaining synchronous copy objects, in accordance with one embodiment. As an option, the method 300 may be carried out in conjunction with features from any other embodiment listed herein, such as those described with reference to the other FIGS. Of course, however, such method 300 and others presented herein may be used in various applications and/or in permutations which may or may not be specifically described in the illustrative embodiments listed herein. Further, the method 300 presented herein may be used in any desired environment. Thus FIG. 3 (and the other FIGS.) should be deemed to include any and all possible permutations.

As shown in FIG. 3, host software 302 transmits a command to a storage system 320. The storage system 320 receives the command. Additionally, the command sent from the host software 302 to the storage system 320 may include a parameter. In one embodiment, the host software 302 may be any software capable of including one or more parameters in commands sent to the storage system 320. The parameter may be any parameter that, upon receipt by the storage system 320, may be processed by the storage system 320 to make a determination as to whether the command will require access to only a single copy or location of a synchronously replicated volume, or will require access to two copies or locations of a synchronously replicated volume.

The command may require access to the two copies or locations of the synchronously replicated volume when the command will result in appending or modifying the volume, and thus the parameter may also be referred to as an append indicator or an append/mod parameter. For example, the command may include a request for mounting a synchronously replicated volume, and the associated parameter may indicate and/or be used to determine whether one or two copies of the synchronously replicated volume should be mounted.

In various embodiments, the storage system 320 may be any system that manages one or more copies of one or more volumes. The storage system 320 may include two or more clusters. Further, the storage system 320 may store data in different physical media, including, but not limited to, storage cartridges, disk drives, solid state disks (SSD), disks direct access storage devices (DASD), magnetic tape drives, libraries, and disk drive arrays, such as RAID (redundant array of independent disks), or JBOD (just a bunch of disks). An example of a storage cartridge is a magnetic tape cartridge, which includes a rewritable magnetic tape wound on a hub of reel, and a cartridge memory. One example of a magnetic tape cartridge includes a cartridge based on LTO (Linear Tape Open) technology.

In one embodiment, the command may be passed from the host software 302 to the storage system 320 during a mounting process of a volume, such as, for example, a virtual tape mount process. In particular, the command from the host software 302 may include a mount command for a virtual tape volume that is synchronously replicated between at least two clusters. In some embodiments the command may be associated with a job control task that controls the processing of one or more jobs, or requests resources needed to run one or more jobs. More specifically, the command may include a data definition statement, which may describe a data set and/or specify input and output resources needed for a data set.

Further, as shown in FIG. 3, the storage system 320 evaluates a policy associated with the host software 302. In particular, at operations 304-308, the storage system 320 determines whether a policy associated with the host software 302 indicates that a single copy of a synchronously replicated volume should be opened, two copies of the synchronously replicated volume should be opened, or if the value of the parameter included in the command should be used to determine the number of copies to open of the synchronously replicated volume.

For example, at operation 304, if an "always open single copy" option is set for a policy associated with the host software 302, then a single copy of a synchronously replicated volume is opened by the storage system 320 at operation 310. The single copy of the synchronously replicated volume may also be referred to herein as a single 'S' location. An "always open single copy" option may be any setting accessible to the storage system 320 that indicates only a single copy of a synchronously replicated volume should be opened under associated conditions. The "always open single copy" option may be configured for the policy associated with the host software 302 by a user, such as an administrator, of the storage system 320.

However, if it is determined at operation 304 that the "always open single copy" option is not set for the policy associated with the host software 302, then at operation 306 it is determined whether an "always open both copies" option is set for the policy associated with the host software 302.

If, at operation 306, the "always open both copies" option is set for the policy associated with the host software 302, then two copies of a synchronously replicated volume are opened by the storage system 320 at operation 312. The two copies of the synchronously replicated volume may also be referred to herein as dual 'S' locations. For example, a volume existing at a first cluster in the storage system 320 may be synchronously replicated at a second cluster in the storage system 320. An "always open both copies" option may be any setting accessible to the storage system 320 that indicates two copies of a synchronously replicated volume should be opened under associated conditions. The "always open both copies" option may be configured for the policy associated with the host software 302 by a user, such as an administrator, of the storage system 320.

However, if it is determined at operation 306 that the "always open both copies" option is not set for the policy associated with the host software 302, then at operation 308 it is determined whether an "open both copies on append/mod" option is set for the policy associated with the host software 302.

If, at operation 308, the "open both copies on append/mod" option is set for the policy associated with the host software 302, then a value of a parameter included in the command may be evaluated at operation 314. In other words, the value of the parameter included in the command from the host software 302 may be determined based on an evaluation of the policy associated with the host software 302. In one embodiment, the parameter may include an append/mod parameter, and, at operation 314, a value of the append/mod parameter may be determined. The parameter may be passed from a host to microcode of the storage system 320.

Based on a value of the parameter, one or two copies of a synchronously replicated volume may be opened by the storage system 320. For example, in response to a determination at operation 314 that the append/mod parameter includes a first value, such as a TRUE value, two copies of the synchronously replicated volume are opened by the storage system 320 at operation 312. Further, in response to a determination at operation 314 that the append/mod parameter includes a second value such as a FALSE value, or otherwise does not include the TRUE value, only a single copy of the synchronously replicated volume is opened by the storage system 320 at operation 310. In other words, the storage system 320 may use a parameter received in association with a command to determine whether a host that transmitted the command needs dual 'S' location of a volume, or can use only a single 'S' location of the volume.

In view of the above, the storage system 320 may manage the reading from and writing to the copies at the synchronous 'S' locations. Specifically, the storage system 320 may mount one or both of the synchronous copies for access by a host application based on a command received from the application. Whether the storage system 320 mounts one or both of the synchronous copies may be based on one or more previously configured policies. In one embodiment, different policies may be assigned to different applications based on historical activity of the applications. For example, if a given application always reads with specific mounts, then an "always open a single copy" option may be associated with those mounts for the application. Similarly, if a given application always writes from a load point or appends with specific mounts, then an "always open both copies" option may be associated with those mounts for the application. Still yet, if it should be determined by the storage system 320 whether to open dual 'S' locations or only one of the 'S' locations based on a content of a command received from an application, then an "open both copies on append/mod" option may be associated with mounts for the application.

In some embodiments, the parameter may include a Boolean type parameter that is passed from the host software 302 to the storage system 320. For example, the parameter may be set to a value representative of TRUE or FALSE, such as a bit value. The parameter may be passed to the storage system 320 during a mount handshake between the host software 302 and the storage system 320. Accordingly, the parameter may indicate whether the host software 302 will modify and/or append a synchronously replicated volume that it has requested mounted. Further, where the host software 302 has requested a private mount of a synchronously replicated volume and the parameter is set to TRUE, the storage system 320 may then efficiently open two 'S' locations of the synchronously replicated volume.

As noted above, in some embodiments, the command may be associated with a job control task that controls the processing of one or more jobs, or requests resources needed to run one or more jobs. In such embodiments, the append/mod parameter may be determined using the job control task. In particular, the append/mod parameter may be set based on a content of the job control task.

In various embodiments, the host software 302 may determine a disposition associated with the command, and set the append/mod parameter accordingly. For example, the append/mod parameter included in the command may be set by the host software 302 based on a disposition (DISP) parameter that describes the status of a data set, and which may instruct a system what to do with the data set after termination of a step or job.

More specifically, the host software 302 may determine that a request in the command will result in a disposition of MOD (DISP=MOD), which may indicate that the host software 302 will be appending or modifying a volume that the host software 302 is requesting mounted. As another example, the host software 302 may determine that a request in the command will result in a disposition of NEW (DISP=NEW), which may indicate that the host software 302 will be appending or modifying a volume that the host software 302 is requesting mounted. Still further, as yet another example, the host software 302 may determine that a request in the command includes a disposition of writing file sequences greater than 1, which may indicate that the host software 302 will be appending or modifying a volume that the host software 302 is requesting mounted In one embodiment, if the disposition is determined by the host software 302 to include a disposition of MOD, NEW, and/or that writes file sequences greater than 1, then the host software 302 may set a value of the append/mod parameter in the command to a value that indicates TRUE. The value of the append/mod parameter may be set to a value that indicates TRUE by setting a bit in the command sent to the storage system 320.

In some embodiments, the command may include a control sequence, and the bit is set in a control sequence sent to the storage system 320. As an option, the bit may also sometimes be manipulated or set by the host software 302 when the host software 302 encounters a write from beginning of tape (BOT) indicator. A write from BOT indicator may be used to indicate to the storage system 320 that the host software 302 intends to write from the beginning of a synchronously replicated tape volume (and so the storage system 320 should mount two copies of the volume).

In some embodiments, if the disposition is determined by the host software 302 to include a disposition of MOD, NEW, and/or that writes file sequences greater than 1, then the host software 302 may evaluate additional conditions. Such conditions may be evaluated by the host software 302 during allocation processing (when a device is assigned), and/or such conditions may be evaluated later during open processing if the mount is deferred until open processing. By evaluating the additional conditions, the host software 302 may continue to gather information about the request for the mount of the volume to determine whether the host software 302 will write to the volume.

In one embodiment, allocation processing includes determining what devices are allocated for a job. As an option, a user, such as an administrator, may configure the host software 302 such that volumes are mounted during allocation processing. As another option, the host software 302 may be configured by the user to defer a mount until a data set is opened, such that an append decision is not necessarily made during the allocation processing, but instead made later during open processing to determine if circumstances have changed between when allocation occurred and when the data set was opened. Such an embodiment may allow the host software 302 to open one copy of a volume for a read, but then perform an append on the volume after opening two 'S' locations.

Thus, in response to determining that an "open both copies on append/mod" option is associated with the host software 302, the storage system 320 may determine whether to open dual 'S' locations or a single 'S' location based on a parameter. The parameter may be received by the storage system 320 during open processing. Further, the host may pass, to the storage system 320, an indication of whether to open dual 'S' locations or a single 'S' location by way of a parameter passed with a mount command. Using the parameter passed with the mount command, the storage system 320 may ensure that two copies of a synchronously replicated volume are open when a mount will resolve in appending or modifying the volume.

In some embodiments, there may exist more than two clusters storing a copy of a synchronously replicated volume. For example, three or more clusters may store copies of a given synchronously replicated volume. In such embodiments, the host may determine which two 'S' locations need to be opened for maintaining synchronous copies of the volume. As an option, the host may further determine to use a deferred option for replicating copies beyond the two 'S' locations. As another option, the host may choose to avoid replicating further copies beyond the two 'S' locations Each of the steps of the method 300 may be performed by any suitable component of the operating environment. Further, the method 300 may be executed, implemented in, and/or available to be performed using a system, apparatus, and/or computer program product, according to various embodiments.

According to one embodiment, an apparatus may include a processor (such as a hardware and/or software processor alone or in combination with the hardware processor) and logic integrated with and/or executable by the processor. The logic may be software-based, hardware-based, and/or a combination thereof according to various approaches. Execution of the logic may cause the processor to perform method 300 or some portion thereof.

In accordance with the various embodiments disclosed herein, a storage system may determine whether to open for a host two copies of a synchronously replicated volume, or only one of the copies of the synchronously replicated volume. This determination may be based on a likelihood of the host to append data to the volume. For example, the storage system may open for the host two copies of the synchronously replicated volume when the host is expected to append or modify the volume. Further, the storage system may open only one of the copies of the synchronously replicated volume when the host is not expected to append data to the volume.

In this manner, the storage system is able to efficiently mount volumes. For example, the storage system may avoid mounting only a single copy of a synchronously replicated volume when the host will append or modify the volume, and which would otherwise result in a synchronization deferred state for the volume. Further, the storage system may avoid utilizing the resources associated with mounting and maintaining two copies of a synchronously replicated volume when only a read of the volume will occur.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. An apparatus, comprising a processor and logic integrated with and/or executable by the processor, the logic being configured to cause the processor to:
   receive, from a host, a command directed to a volume, the command including a parameter,
   wherein the command includes a mount command directed to the volume,
   wherein the parameter is based on conditions evaluated during allocation processing;
   evaluate a policy associated with the host;
   based on the evaluation of the policy associated with the host, determine a value of the parameter included in the command;
   in response to the parameter including a first value, open two copies of the volume; and
   in response to the parameter including a second value, open only one of the two copies of the volume.

2. The apparatus of claim 1, wherein the volume includes a synchronously replicated volume.

3. The apparatus of claim 2, wherein the two copies of the synchronously replicated volume are opened based on the parameter to avoid putting the synchronously replicated volume into a synchronization deferred state.

4. The apparatus of claim 1, the parameter in the command is set to include the first value based on conditions evaluated during an open processing that occurs when the one of the two copies of the volume is already open, and the two copies of the volume are opened in response to the parameter in the command being set to include the first value.

5. The apparatus of claim 1, wherein the parameter is received from the host at a storage system during a mount handshake between the host and the storage system.

6. The apparatus of claim 1, wherein the volume is a virtual tape volume, such that the mount command is for mounting the virtual tape volume.

7. The apparatus of claim 1, wherein the parameter is set in the mount command by the host.

8. The apparatus of claim 7, wherein the conditions evaluated by the host include a disposition parameter that describes a status of a data set, such that the value of the parameter in the mount command is set by the host based on the disposition parameter.

9. The apparatus of claim 8, wherein the value of the parameter in the mount command is set by the host based on the disposition parameter including a DISP=MOD.

10. The apparatus of claim 9, wherein the value of the parameter in the mount command is set to the first value by the host in response the disposition parameter including the DISP=MOD.

11. The apparatus of claim 8, wherein the value of the parameter in the mount command is set by the host based on the disposition parameter including a DISP=NEW.

12. The apparatus of claim 11, wherein the value of the parameter in the mount command is set to the first value by the host in response the disposition parameter including the DISP=NEW.

13. The apparatus of claim 8, wherein the value of the parameter in the mount command is set by the host based on the disposition parameter including a write of a file sequence greater than 1.

14. The apparatus of claim 13, wherein the value of the parameter in the mount command is set to the first value by the host in response the disposition parameter including the write of the file sequence greater than 1.

15. The apparatus of claim 1, wherein the parameter includes an append indicator, wherein the append indicator is set in the mount command during the allocation processing.

16. A method for dynamic volume mounting, the method comprising:

receiving, from a host, a command directed to a volume, the command including a parameter, wherein the command includes a mount command directed to the volume, and the volume includes a synchronously replicated volume, wherein the parameter in the mount command is based on conditions evaluated during allocation processing and/or open processing;

evaluating a policy associated with the host;

based on the evaluation of the policy associated with the host, determining a value of the parameter included in the command;

in response to the parameter including a first value, opening two copies of the volume; and in response to the parameter including a second value, opening only one of the two copies of the volume.

17. The method of claim 16, wherein the conditions include a disposition parameter that describes a status of a data set, such that the value of the parameter in the mount command is based on the disposition parameter.

18. A computer program product for dynamic volume mounting, the computer program product comprising a computer readable storage medium having program instructions embodied therewith, the program instructions executable by a processor to cause the processor to perform a method comprising:

receiving, from a host, a command directed to a volume, the command including a parameter, wherein the command includes a mount command directed to the volume, and the volume includes a synchronously replicated volume, wherein the parameter in the mount command is based on conditions evaluated during allocation processing and/or open processing;

evaluating a policy associated with the host;

based on the evaluation of the policy associated with the host, determining a value of the parameter included in the command;

in response to the parameter including a first value, opening two copies of the volume; and in response to the parameter including a second value, opening only one of the two copies of the volume.

19. The computer program product of claim 18, wherein the parameter includes an append indicator, such that the append indicator is set in the mount command during the allocation and/or open processing.

20. The computer program product of claim 18, wherein the conditions include a disposition parameter that describes a status of a data set, such that the value of the parameter in the mount command is based on the disposition parameter.

* * * * *